United States Patent
Davis et al.

(10) Patent No.: US 11,917,077 B2
(45) Date of Patent: *Feb. 27, 2024

(54) METHOD AND SYSTEM FOR QUANTUM-RESISTANT HASHING SCHEME

(71) Applicant: Mastercard International Incorporated, Purchase, NY (US)

(72) Inventors: Steven C. Davis, Saint Peters, MO (US); Paul Taylor, Saint Peters, MO (US); Eduardo Andrade, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,793

(22) Filed: Mar. 22, 2023

(65) Prior Publication Data

US 2023/0275765 A1 Aug. 31, 2023

Related U.S. Application Data

(63) Continuation of application No. 17/317,456, filed on May 11, 2021, now Pat. No. 11,626,999, which is a
(Continued)

(51) Int. Cl.
  *H04L 9/40* (2022.01)
  *H04L 9/06* (2006.01)
  (Continued)

(52) U.S. Cl.
  CPC .......... *H04L 9/3252* (2013.01); *H04L 9/0643* (2013.01); *H04L 9/0836* (2013.01); *H04L 9/50* (2022.05)

(58) Field of Classification Search
  CPC ... H04L 9/3252; H04L 9/0643; H04L 9/0836; H04L 9/50
  See application file for complete search history.

(56) References Cited

U.S. PATENT DOCUMENTS 10,389,518 B2   8/2019   Chen et al.
10,749,681 B2   8/2020   Andrade
(Continued)

FOREIGN PATENT DOCUMENTS

EP   3396608 A1   10/2018

OTHER PUBLICATIONS

Kiktenko et al., "Quantum-secured blockchain", May 31, 2018, 9 pages (Year: 2018).*
(Continued)

*Primary Examiner* — Thaddeus J Plecha
(74) *Attorney, Agent, or Firm* — Panitch Schwarze Belisario & Nadel LLP

(57) ABSTRACT

A method for moderation in a permissioned blockchain using a hash-oriented scheme includes: storing a blockchain including a most recent block; receiving transaction data values; receiving a first reference value and a second reference value; generating a first hash value by hashing the first reference value; generating a block proof including the first hash value, a second hash value, a third reference value, and a block value; verifying a block header of the most recent block using the block proof; receiving a new block value; generating a new block header including the first reference value, the second reference value, a fourth reference value, and the new block value; generating a new block for the blockchain including the new block header and the transaction data values; and transmitting the new block to one or more additional nodes associated with the blockchain.

20 Claims, 9 Drawing Sheets

Related U.S. Application Data continuation-in-part of application No. 16/185,611, filed on Nov. 9, 2018, now Pat. No. 11,063,764.

(51) Int. Cl.
  *H04L 9/08* (2006.01)
  *H04L 9/32* (2006.01)
  *H04L 9/00* (2022.01)

(56) References Cited

U.S. PATENT DOCUMENTS

| | | |
|---|---|---|
| 11,416,864 B2 | 8/2022 | Mokhasi |
| 11,423,398 B1 | 8/2022 | Mullins et al. |
| 2008/0005573 A1 | 1/2008 | Morris et al. |
| 2017/0111175 A1 | 4/2017 | Oberhauser et al. |
| 2017/0178128 A1 | 6/2017 | Fourez et al. |
| 2017/0270493 A1 | 9/2017 | Lugli et al. |
| 2017/0317834 A1 | 11/2017 | Smith et al. |
| 2018/0121923 A1 | 5/2018 | Uhr et al. |
| 2018/0152304 A1 | 5/2018 | Ebrahimi et al. |
| 2018/0270065 A1 | 9/2018 | Brown et al. |
| 2018/0287800 A1 | 10/2018 | Chapman et al. |
| 2018/0351747 A1 | 12/2018 | Spangemacher et al. |
| 2019/0354944 A1 | 11/2019 | Russinovich |
| 2020/0076798 A1 | 3/2020 | Lidsky |
| 2020/0127845 A1 | 4/2020 | Yang et al. |
| 2020/0134760 A1 | 4/2020 | Messerges et al. |
| 2020/0153630 A1 | 5/2020 | Davis |
| 2020/0169417 A1 | 5/2020 | Yang et al. |
| 2020/0244470 A1 | 7/2020 | Ruckriemen et al. |
| 2021/0106920 A1 | 4/2021 | Lim |
| 2022/0172284 A1* | 6/2022 | Tarmann ............... G06F 16/337 |

OTHER PUBLICATIONS

Ezawa et al., "Design and Implementation of Authentication and Authorization System with Blockchain", Computer Security Symposium, Oct. 2018, 842-849.

International Search Report (PCT/ISA/210 and Written Opinion (PCT/ISA/237) dated Jan. 21, 2020, by the Japanese Patent Office as the International Searching Authority for International Application No. PCT/US2019/055768) (8 pages).

Int'l Search Report and Written Opinion dated Jul. 5, 2022 in Int'l Application No. PCT/US2022/023795.

Moderated redactable blockchains: A definitional framework with an efficient construct. In Data Privacy Management, Cryptocurrencies and Blockchain Technology (pp. 355-373). Springer, Cham Dousti, M. S., & K p, A. Dec. 31, 2020 (Dec. 31, 2020).

* cited by examiner

METHOD AND SYSTEM FOR QUANTUM-RESISTANT HASHING SCHEME

FIELD

The present disclosure relates to being able to verify proof of an assertion, such as a presented identity or contract, through the use of a hashing scheme that is resistant to being broken or solved through the use of computing techniques including quantum computing.

BACKGROUND

Many cryptographic techniques revolve around the use of complex algorithms that include mathematical problems that are nearly impossible for a standard computer to solve. For example, blockchains and other technology that relies on the use of digital signatures often utilize RSA (Rivest-Shamir-Adleman), which relies on prime factorization, or ECDSA (elliptic curve digital signature algorithm), which uses a discrete logarithmic problem. In both cases, standard computers are too slow and inefficient to solve these mathematical problems, making the related algorithms suitably cryptographically secure.

However, quantum computing is being developed, which, if successful, has the potential to solve such mathematical problems. As a result, the use of digital signatures through algorithms such as RSA and ECDSA may become ineffective when the underlying math problems can be solved, giving rise to a number of vulnerabilities and security threats. In addition, traditional hash-based signatures have data sizes that are too impractical for use. Thus, there is a need for a technological system where a cryptographic technique can be used that is resistant to solving efforts by even quantum computing while still providing the proof of identities and assertions available from existing algorithms.

SUMMARY

The present disclosure provides a description of systems and methods for proof of assertion of a value using a hash-oriented transaction scheme. The use of hashing instead of a standard algorithm that relies on a mathematical problem provides for resistance against quantum computing, particularly when a sufficient complex hash is used with a resulting value that is of sufficient size to be resistant to collision, such as SHA-256. A blockchain is used to store declarations, where blockchain provides an immutable and time-stamped record of declaration messages. The declaration includes a value that a user may later want to prove, such as an identity document, contract, land deed, voting record, etc. The declaration also includes a hash value that is generated by hashing the value as well as one or more other items that are known only to the user. When the user wants to prove ownership of that value, or otherwise attest to its authenticity, the user can make a confirmation message on the blockchain. The confirmation message includes the one or more other items that were used to create the hash value stored in the declaration. By revealing those values being known to the user, any entity wishing to audit the user's assertion can compute the hash value using the value to be attested-to and the one or more items in the confirmation message and check it against the hash value in the declaration. A match proves the user's assertion successful. The result is a system that is resistant to quantum computing, while still enabling a user to quickly, easily, and securely prove assertion of a value through use of hashing and blockchain.

A method for moderation in a permissioned blockchain using a hash-oriented scheme includes: storing, in a memory of a processing server, a blockchain comprised of a plurality of blocks including a most recent block, the most recent block including a block header; receiving, by a receiver of a processing server, one or more transaction data values; receiving, by the receiver of a processing server, a first reference value and a second reference value; generating, by a processing device of the processing server, a first hash value by hashing the first reference value; generating, by the processing device of the processing server, a block proof including at least the first hash value, a second hash value, a third reference value, and a block value; verifying, by the processing device of the processing server, the block header included in the most recent block using the block proof; receiving, by the receiver of the processing server, a new block value; generating, by the processing device of the processing server, a new block header including at least the first reference value, the second reference value, a fourth reference value, and the new block value; generating, by the processing device of the processing server, a new block for the blockchain including the new block header and the one or more transaction data values; and transmitting, by a transmitter of the processing server, the new block to one or more additional nodes associated with the blockchain.

A system for moderation in a permissioned blockchain using a hash-oriented scheme includes: a processing server as a node associated with a blockchain; and one or more additional nodes associated with the blockchain, wherein the processing server includes at least a transmitter, a memory storing a blockchain comprised of a plurality of blocks including a most recent block, the most recent block including a block header, a receiver receiving one or more transaction data values, a first reference value, a second reference value, and a processing device generating a first hash value by hashing the first reference value, generating a block proof including at least the first hash value, a second hash value, a third reference value, and a block value, and verifying the block header included in the most recent block using the block proof, the receiver further receives a new block value, the processing device further generates a new block header including at least the first reference value, the second reference value, a fourth reference value, and the new block value, and generates a new block for the blockchain including the new block header and the one or more transaction data values, and the transmitter transmits the new block to one or more additional nodes associated with the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Figure 1:
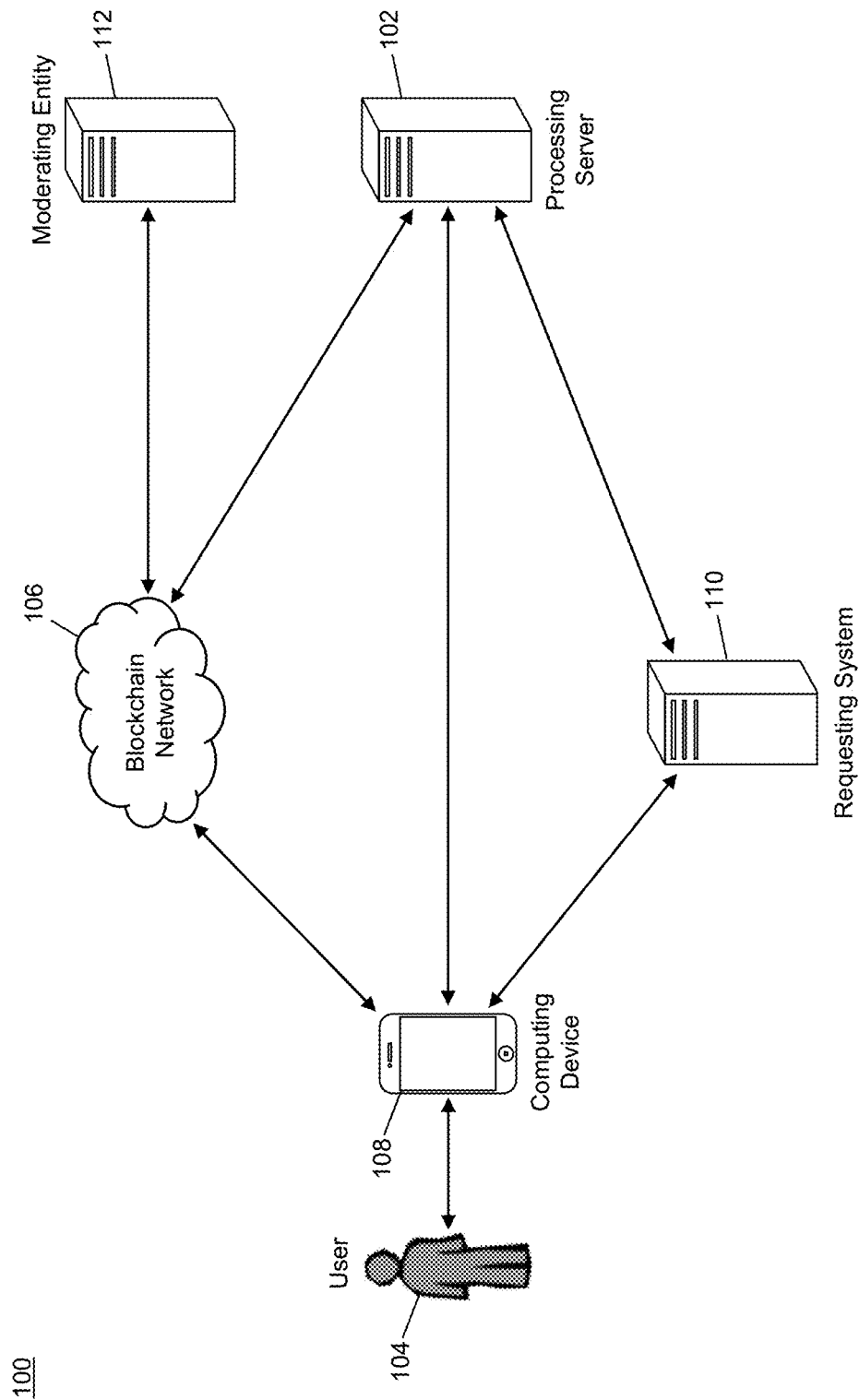
FIG. 1 is a block diagram illustrating a high-level system architecture for proving an assertion of a value using a hash-oriented transaction scheme and blockchain in accordance with exemplary embodiments.

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a digital asset amount, such that the blockchain records what asset(s) is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.
System for Proof of Assertion Using Hashing and Blockchain FIG. 1 illustrates a system 100 for verifying proof of assertion of a value through the use of a hash-oriented transaction scheme and a blockchain.

The system 100 may include a processing server 102. The processing server 102, discussed in more detail below, may be configured to verify proof supplied by a user 104 asserting to a specific value. In the system 100, the specific value may be supplied by a user 104 to a blockchain associated with a blockchain network 106. The specific value may be submitted to the blockchain network 106 by the user 104 in a declaration message, discussed in more detail below.

The blockchain network 106 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 106 prior to the generation and addition of a new block to the blockchain in order for the change to be made permanent. Computational and communication limitations may make such a modification exceedingly difficult, if not impossible, thus rendering the blockchain immutable.

Each blockchain data value may correspond to a confirmation message, as discussed below, or a declaration message. A declaration message may be submitted to a node in the blockchain network by a user 104 using a suitable computing device 108, such as a desktop computer, laptop computer, notebook computer, tablet computer, cellular phone, smart phone, smart watch, smart television, wearable computing device, or any other type of computing device specifically configured to perform the functions discussed herein. The declaration message may include the specific value that the user 104 may later want to prove, either as proof of the value itself as genuine, proof of ownership of the value, etc. For example, the specific value may be an identity document, where use of the methods discussed herein may enable the user 104 to prove that they are the person detailed in the identity document. In another example, the specific value may be a land deed, where the methods discussed herein enable the user 104 to prove that they are the owner of the land deed and thus the land to which it applies.

The declaration message may also include a hash value, also referred to herein as an "identity hash value." The hash value may be generated by hashing the specific value and one or more additional values, referred to herein as "chain values." The chain values may be known to the user 104 when the declaration message is submitted, but may be otherwise unknown to any other entity, particularly any node in the blockchain network 106. The user 104 may generate the identity hash value via hashing the specific value and the chain value(s) using any suitable hashing algorithm, such as SHA-256. In an exemplary embodiment, a collision-resistant hashing algorithm may be used. In a preferred embodiment, at least two chain values may be used in generating the hash value. The user 104 may submit the declaration message to a node in the blockchain network 106, with the declaration message including at least the specific value and the identity hash value. The declaration message may then be included in a new block that is verified and added to the blockchain.

In the system 100, a requesting system 110 may request that the user 104 provide proof of an assertion of the specific value. For instance, in the example where the specific value is an identity document, the requesting system 110 may request that the user 104 provide proof of their identity. In such an example, the user 104 may use the blockchain and the identity hash value to prove that they are the individual indicated in the identity document stored in the declaration message. The requesting system 110 may submit a confirmation request to the processing server 102. The confirmation request may indicate the declaration message for which the requesting system 110 wants verification. In some cases, each declaration message may include a unique identifier, which may be included in the confirmation request for use by the processing server 102 in identifying the declaration message.

The processing server 102 may then attempt to verify the value included in the declaration message via proof of an assertion provided by the user 104. The verification may be performed through the use of a confirmation message stored in the blockchain. The confirmation message may be submitted by the user 104 (e.g., via the computing device 108) to a node in the blockchain network 106 when verification is requested. In some cases, the processing server 102 may request that the user 104 submit the confirmation message (e.g., after receiving the confirmation request from the requesting system 110, where contact information for the user 104 may be included in the confirmation request). In some instances, the requesting system 110 may request that the user 104 post the confirmation message. For instance, in the above example, when the requesting system 110 requests that the user 104 provide proof of their identity, the user 104 may respond by submitting the confirmation message to the blockchain and providing the requesting system 110 with the identifier for the declaration message that includes their identity document.

To verify the user's proof of the assertion of the specific value, the processing server 102 may first identify the confirmation message stored in the blockchain. In some cases, each confirmation message may include the identifier found in the declaration message to which it corresponds. In other cases, each confirmation message may include its own identifier, where identifiers are thereby unique to all messages in the blockchain, where the user 104 or requesting system 110 may provide that identifier to the processing server 102 for use in identifying the confirmation message.

A confirmation message may include at least the check value(s) that were used by the user 104 when generating the identity hash value that was stored in the declaration message. The processing server 102 may identify the check value(s) in the confirmation message, and then generate a check hash value using the check value(s) and the specific value that is included in the identified declaration message. The processing server 102 can then check the check hash value against the identity hash value found in the declaration message to see if there is a match. If there is a match, then that means that the user 104 had to have possession of the specific value when it was added to the blockchain (e.g., at the timestamp found in the block header of the block that includes the declaration message) since they had the check value(s) used to generate the identity hash value. This may serve as proof of the assertion of the specific value, where the processing server 102 may then notify the requesting system 110 accordingly. If there is no match between the check hash value and the identity hash value, then the processing server 102 may inform the requesting system 110 accordingly that the user's attempted proof failed.

Thus, the methods and systems discussed herein enable a user 104 to assert ownership or existing of a value at a specific time through the use of a blockchain, where proof of that assertion can be verified through the use of a hash-oriented transaction scheme via the use of a later-submitted confirmation message to the blockchain. The verification can be performed easily by the processing server 102 specially configured as disclosed herein, enabling a requesting system 110 to have the proof verified easily and without having to perform any complicated actions itself. In addition, by using a hash instead of a digital signature, the methods discussed herein are resistant to attempted solves through quantum computing, while a sufficient complex hashing algorithm ensures a lack of collisions, thereby resulting in a secure, yet easily implemented system.

In some embodiments, confirmation and declaration messages may be chained together to provide for additional security regarding proof of ownership and assertions, as well as to transfer ownership of the specific value to another user. Chaining may be performed through the use of additional chain values. For instance, a confirmation message may include two chain values that are used in calculating the identity hash value found in a declaration message. The declaration message may include two new chain values. These new chain values may be part of a hash chain used in a new declaration and confirmation message combination.

For example, a declaration message may include a value X and an identity hash value generated by hashing a combination of X, A, and B. Thus, A and B may be the chain values that are found in the confirmation message used in verification of the value X. The declaration message may further include two new chain values, $C_2$ and $D_2$. A subsequent declaration message may be submitted by the user 104 for a later proof round of the value X, where the declaration message may include an identity hash value generated by hashing a combination of X, $C_1$, and $D_1$. The values for $C_2$ and $D_2$ may be related to the values of $C_1$ and $D_1$, such as being the hashes of the values of $C_1$ and $D_1$, where $C_2$=H($C_1$) and $D_2$=H($D_1$), where H refers to a hashing operation.

In an example, a voter may be required to prove their identity with a voting administrator prior to voting in a public election, where their identity document is the value X. The voter may be in possession of $C_1$ and can generate $C_2$ as needed via hashing. To establish the proof of identity, the voting administrator may provide the voter with $D_1$. The voter may generate $D_2$ via hashing $D_1$ and then post the declaration message that includes $C_2$, $D_2$, the identity document, and the hash of $C_1+D_1+$the identity document. At this time, the voting administrator can see the declaration and recognize $D_2$ based on their provided value. The voting administrator can then wait for the voter to post the confirmation message of their own $C_1$ with the supplied $D_1$, and use the values to confirm the hash in the declaration message. Once confirmed, it proves the possession of the identity document by the voter, and the voter's identity can thus be verified.

In some cases, one of the new chain values used in a declaration message may be part of a new hash chain. For instance, the user 104 may submit a first declaration message for a value X that includes an identity hash value of $H(X+A_1+B_1)$ (where the corresponding confirmation message includes chain values $A_1$ and $B_1$). The first declaration message may also include new chain values of $A_2$ and $B_2$. For a second declaration message, a new hash chain may be utilized, such that the second declaration message includes the value X and an identity hash value of $H(X+B_3+C_1)$. The confirmation message for the second declaration message may thus include chain values of $B_3$ and $C_1$. Thus, a nefarious actor could not simply continue to hash the chain values in a declaration message to attempt to guess at a later declaration-confirmation combination since a new hash chain, $C_1$ is used. Similarly, if the user 104 wants to transfer ownership of the value X, they can be given the identity hash value $H(X+B_3+C_1)$ from the new user, where the new user knows the value of $C_1$ with it being unknown to the user 104. Thus, only the new user can provide the verifiable proof of the assertion of value X. Accordingly, the use of hash chains or other newly introduced chain values in declaration messages can be used to easily transfer ownership or other assertions of a value in the system 100.

In some instances, the blockchain may be a permissioned or otherwise moderated blockchain, where one or more moderating entities 112 may participate in the blockchain network 106 to moderate the participation of computing devices 108, processing servers 102, and/or other systems involved in the blockchain. In such instances, the moderating entity 112 may be required to provide its own digital signature for a new block that is added to a blockchain. As a result, three entities may be involved in any new action that is being represented in the blockchain and, as such, the use of declaration and confirmation messages may be insufficient for the inclusion of the moderating entity 112. In such instances, block headers may be used in conjunction with hash chains as discussed above, where each block header may include a hash chain value.

In such embodiments, the block header may be used to store the value X, the hash value H generated by hashing a combination of X and the chain values, as well as the chain values themselves. In these embodiments, the chain values may include values associated with the entities involved in the transfer (e.g., chain values $A_1$ and $B_2$) and may also include another chain value associated with the moderating entity (e.g., chain value $C_2$). An illustrative example of block headers in a moderated blockchain is found in FIG. 4, discussed in more detail below. In such blockchains, transfer of ownership may be performed in the sense that the "owner" of the chain has the right to confirm the next block. In some instances, an entity may repeat as the owner by transferring ownership back to itself with each new block that is added. For example, a moderating entity 112 may maintain full ownership for confirmation of all blocks, where other entities may participate therein, such as discussed above.

In such embodiments, the value X that is included in the header of each block may be comprised of version data, such as a block version, network identifier, and slot number, a hash of the block header of the prior block (e.g., a block reference value), and the root of a Merkle tree of all transactions included in the new block being added (e.g., a data reference value). This value X may be included in the hash value that is added in each block, where the value X may be combined with chain values, as in the process discussed above and illustrated in FIG. 4.

Processing Server

Figure 2:
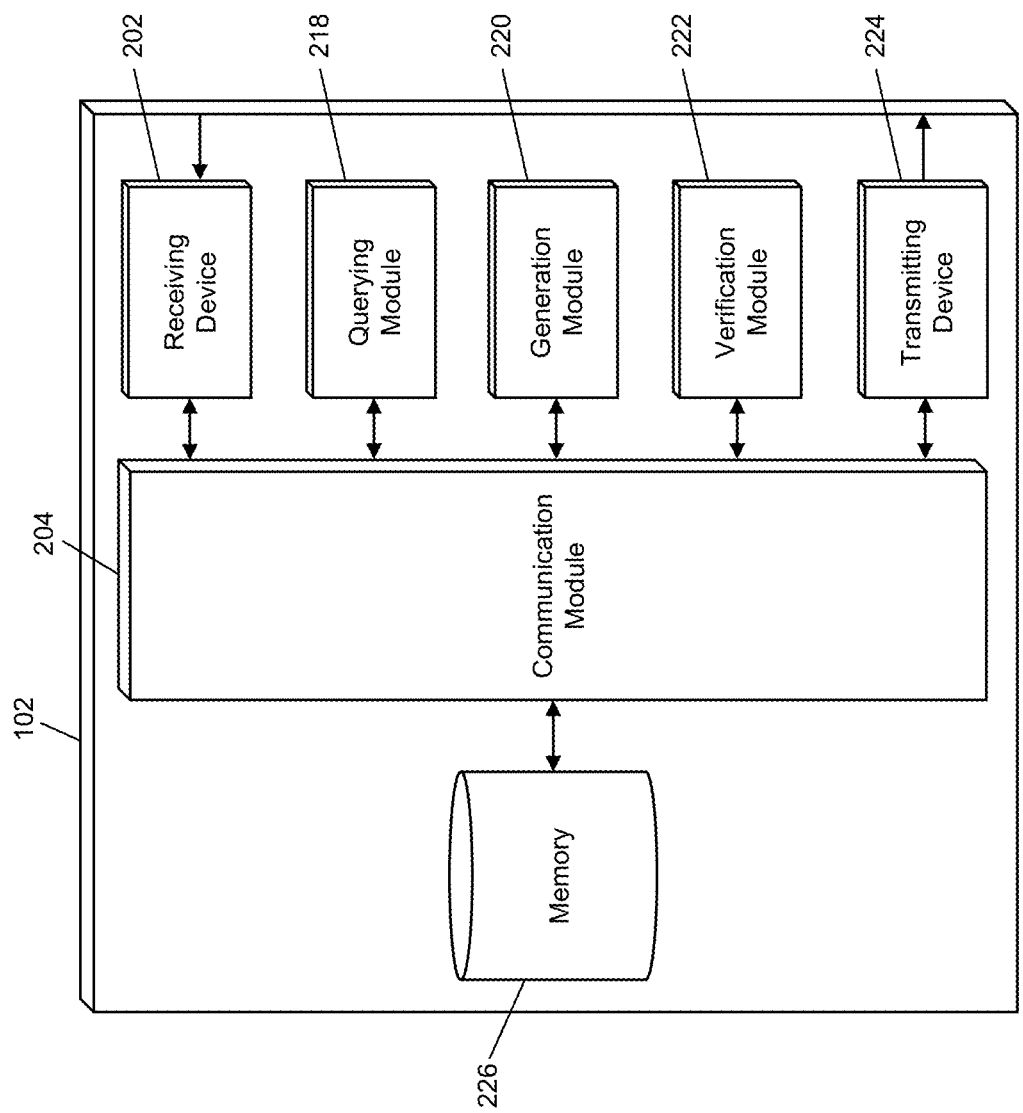
FIG. 2 is a block diagram illustrating the processing server of the system of FIG. 1 for verifying an assertion of a value using a hash-oriented transaction scheme and blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from blockchain networks 106, computing devices 108, requesting systems 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by nodes in blockchain networks 106 that may be superimposed or otherwise encoded with blockchain data, including blockchain data values that may include confirmation messages and declaration messages. In some embodiments, the receiving device 202 may receive a full copy of the blockchain including all new blocks. In other embodiments, the receiving device 202 may receive blocks as requested. In other embodiments, the receiving device 202 may receive blockchain data values. In some embodiments, the processing server 102 may be a node in the blockchain network 106 and may receive blocks for verification and addition to the blockchain from other nodes in the blockchain network 106. The receiving device 202 may also be configured to receive data signals electronically transmitted by computing devices 108 and/or requesting systems 110 that are superimposed or otherwise encoded with confirmation requests, which may include identifiers for declaration and/or confirmation messages.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, verification module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a querying module 218. The querying module 218 may be configured to execute queries on databases to identify information. The querying module 218 may receive one or more data values or query strings, and may execute a query string based thereon on an indicated database, such as a memory 226, to identify information stored therein. The querying module 218 may then output the identified information to an appropriate engine or module of the processing server 102 as necessary. The querying module 218 may, for example, execute a query on the memory 226 to identify a declaration message or a confirmation message stored in a block in the blockchain, such as using an identifier.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate notifications and other data messages for transmission to computing devices 108 or requesting systems 110, such as prompts for confirmation messages and/or identifiers or results of attempted verifications, as well as for transmission to nodes in the blockchain network 106, such as requesting new blocks or blockchain data values. The generation module 220 may also be configured to generate check hash values by hashing data. In embodiments where the processing server 102 is a node in the blockchain network 106, the generation module 220 may also be configured to generate block headers and new blocks for validation and adding to the blockchain.

The processing server 102 may also include a verification module 222. The verification module 222 may be configured to verify data as part of the functions of the processing server 102 as discussed herein. The verification module 222 may receive data to be verified as input, may attempt to verify the data, and may output a result of the verification to another module or engine of the processing server 102. In some cases, the input may include data to be used in the verification. In some instances, the verification module 222 may be configured to identify data to be used in the verification, such as by instructing the generation module 220 to generate a check hash value using chain values in a declaration message for use of the check hash value by the verification module 222. The verification module 222 may be configured to, for example, verify identity hash values found in declaration messages using check hash values generated using the chain values found in a corresponding confirmation message.

The processing server 102 may also include a transmitting device 224. The transmitting device 224 may be configured to transmit data over one or more networks via one or more network protocols. In some instances, the transmitting device 224 may be configured to transmit data to blockchain networks 106, computing devices 108, requesting systems 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to nodes in blockchain networks 106 that are superimposed or otherwise encoded with requests for blockchain data values or blocks, which may include identifiers for declaration or conformation messages. The transmitting device 224 may also be configured to electronically transmit data signals to computing devices 108, which may be superimposed or otherwise encoded with requests for submission of confirmation messages, request for identifiers for confirmation messages, etc. The transmitting device 224 may also be configured to electronically transmit data signals to requesting systems 110, which may be superimposed or otherwise encoded with verification results.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data including confirmation messages and declaration messages, hashing algorithms for generating blocks, hashing algorithms for generating check hash values, credentials for validation, usage rule templates, communication data for blockchain nodes, communication data for computing devices 108 and requesting systems 110, etc.

Declaration and Confirmation Messages

Figure 3:
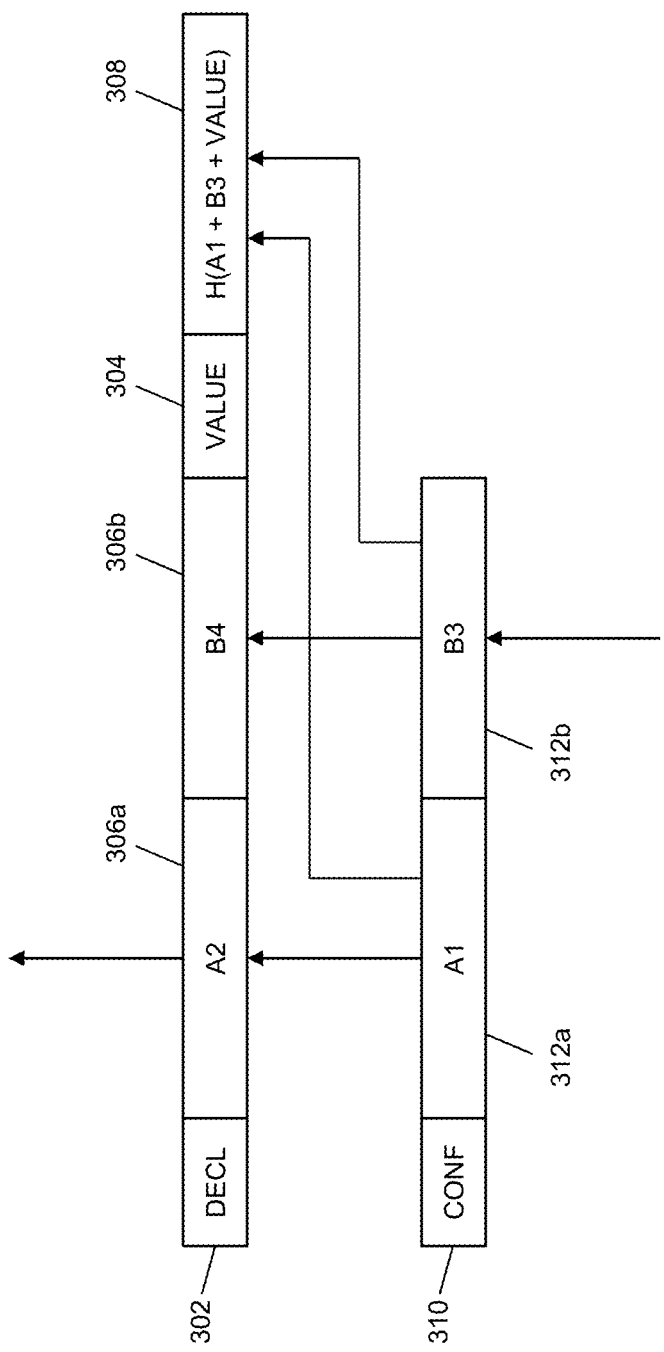
FIG. 3 is a diagram illustrating example declaration and confirmation messages that may be stored in the blockchain of FIG. 1 in accordance with exemplary embodiments.

FIG. 3 illustrates example declaration and confirmation messages for use in the system 100 of FIG. 1 in the verification of proof of assertion of a value.

As discussed above, the user 104 may submit a declaration message 302 to the blockchain network 106 for inclusion in a new block that is verified and added to the blockchain. The declaration message may include a specific value 304, where the user 104 may want to assert proof of the specific value 304 (e.g., such as an identity document in the example discussed above). The declaration message may also include an identity hash value 308, where the identity hash value is a hash value generated via hashing the specific value 304 as well as two chain values 312. At the time of submission of the declaration message 302, the chain values 312 may be known to the user 104, but not to anyone else. The declaration message 302 may also include two new chain values 306, illustrated in FIG. 3 as new chain values 306a and 306b, which may be part of hash chains used for later declaration and confirmation message pairs.

When the user 104 wants to prove assertion of the specific value 304, the user 104 may submit a confirmation message 310 to the blockchain. The confirmation message may include the chain values 312, illustrated in FIG. 3 as chain values 312a and 312b that were used to generate the identity hash value 308. In some embodiments, the chain values 312 may be part of hash chains with the new chain values 306. In the example illustrated in FIG. 3, new chain value 306a may be a hash of chain value 312a, and new chain value 306b may be a hash of chain value 312b. In the illustrated example, chain value 312a may be the start of a new hash chain, while chain value 312b may be part of an existing hash chain, such as was used in an earlier set of declaration and confirmation messages.

Block Headers in a Moderated Blockchain

Figure 4:
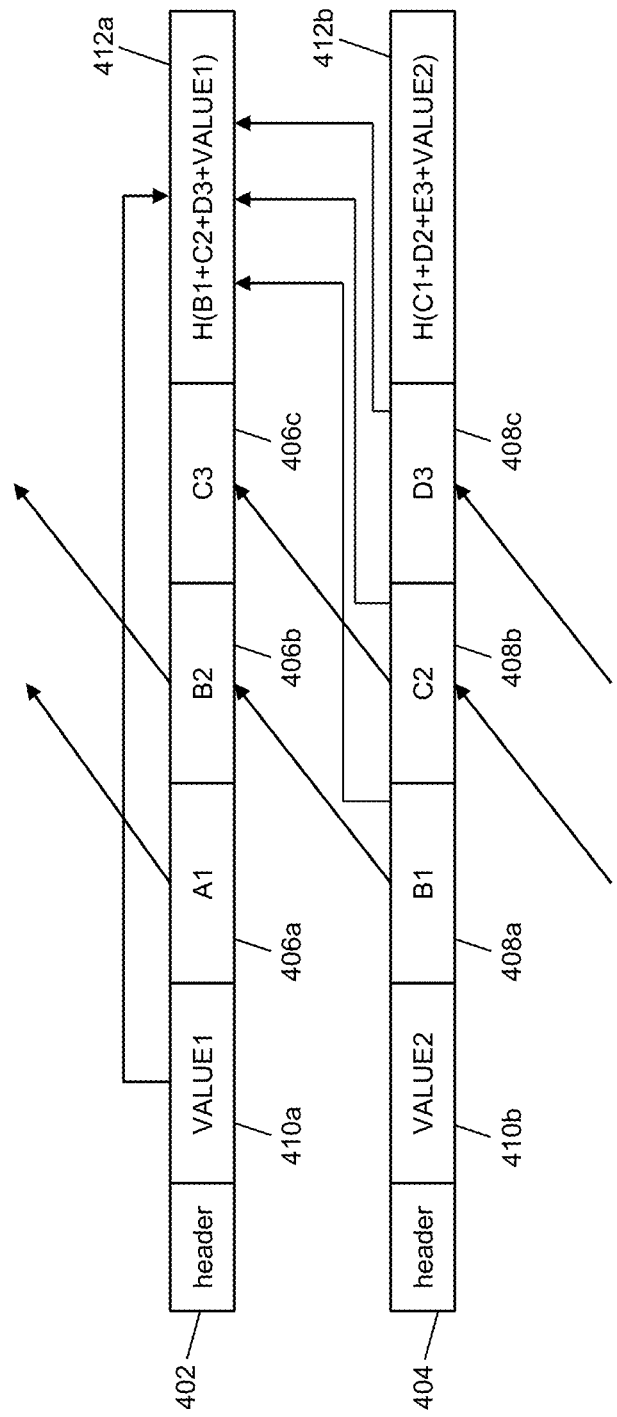
FIG. 4 is a diagram illustrating example messages that may be stored in the blockchain of FIG. 1 for ownership transfer through block headers in accordance with exemplary embodiments.

FIG. 4 illustrates example block headers for use in the system 100 of FIG. 1 in the confirmation of block headers for a moderated blockchain that utilizes hash chains.

In the system 100, a requesting system 110 may have an interest in obtaining ownership of the blockchain in the sense that they would be able to construct a new block for the blockchain. The requesting system 110 may be represented by the chain values labeled with "B" in the illustrated example, where the requesting system 110 does not have current ownership but wants to obtain it to be able to construct a later block 404. In order to get ownership, the requesting system 110 will seek ownership from the current owner, the processing server 102, represented by the chain values labeled with "A" in the illustrated example. Prior to obtaining ownership, the requesting system 110 will have to be aware of the next transfer that will occur, where such a subsequent entity is illustrated by the chain values labeled with "C."

In order to receive ownership, the requesting system 110 will transmit chain values 406b and 406c to the processing server 102, where chain value 406b is $B_2$, which is a hash of $B_1$, a value known only to the requesting system 110. The chain value 406c is $C_3$, which is a hash of $C_2$, which is known to be requesting system 110 by the subsequent entity and whose underlying value is unknown to the requesting system 110. The processing server 102 will then have the specific value 410a and the chain values 406b and 406c. In order to be able to add the new block 402, the requesting system 110 must supply the block value 412a, which is a hash of the chain values known to the requesting system 110 and not the processing server 102. The processing server 102 then generates the new block 402 consisting of the chain values 406a, 406b, and 406c, the specific value 410a, and the hash value 412a. With the addition of the new block 402 the ownership for block construction transfers to the requesting system 110 as the requesting system 110 is the only entity with knowledge of at least chain value 408a. The requesting system 110 may then be able to transfer ownership to the subsequent entity, having the underlying value for the chain value 408b, using Value 2 (410b), 408c and 412b with respect to a requesting system in the same manner described above, and so on for new blocks thereafter.

Process for Verifying Proof of Assertion Using Hashing and Blockchain

Figure 5A:
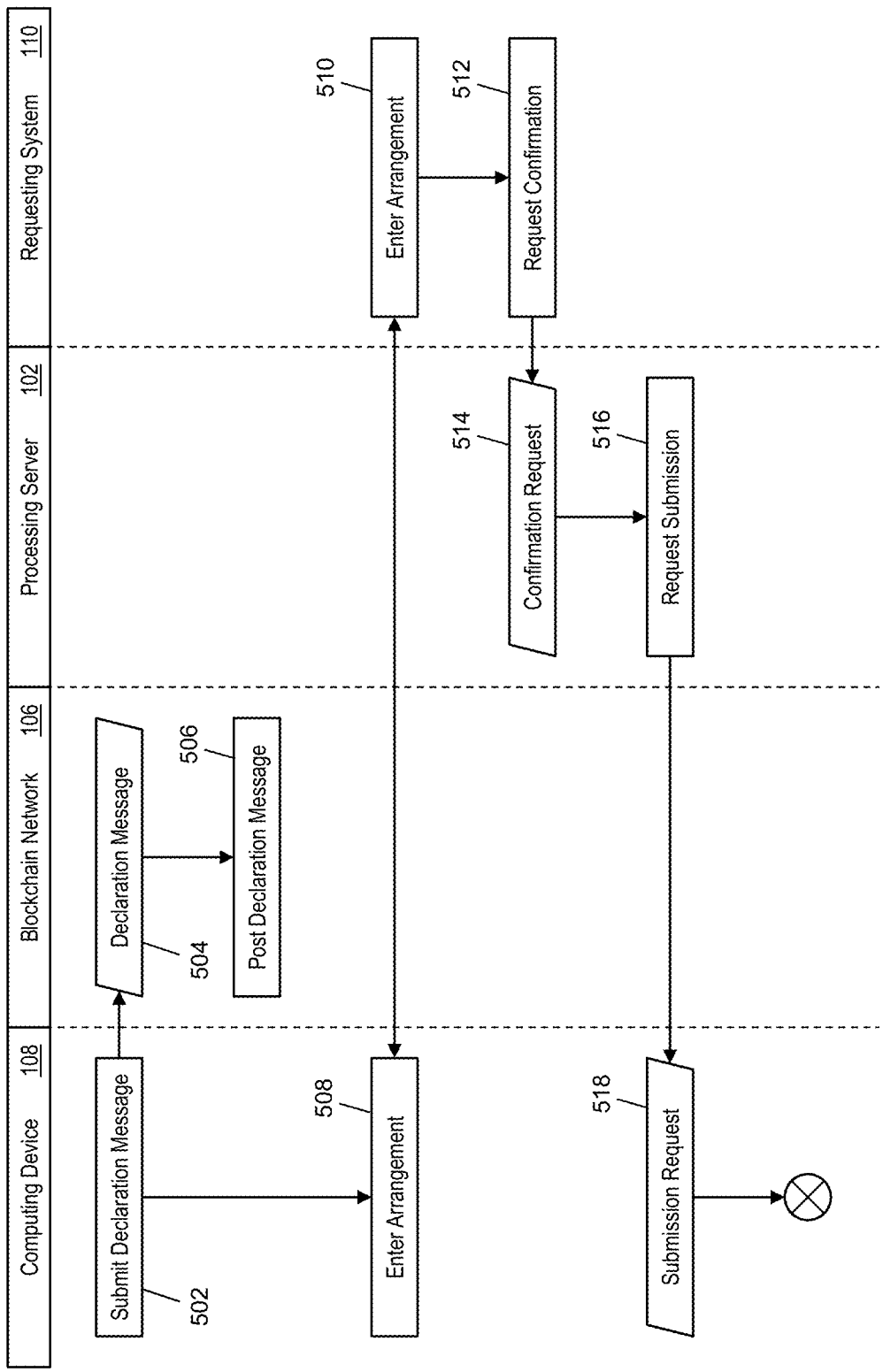
FIGS. 5A and 5B are a flow diagram illustrating a process for verifying an asserted value using a hash-oriented transaction scheme and blockchain in the system of FIG. 1 in accordance with exemplary embodiments.
Figure 5B:
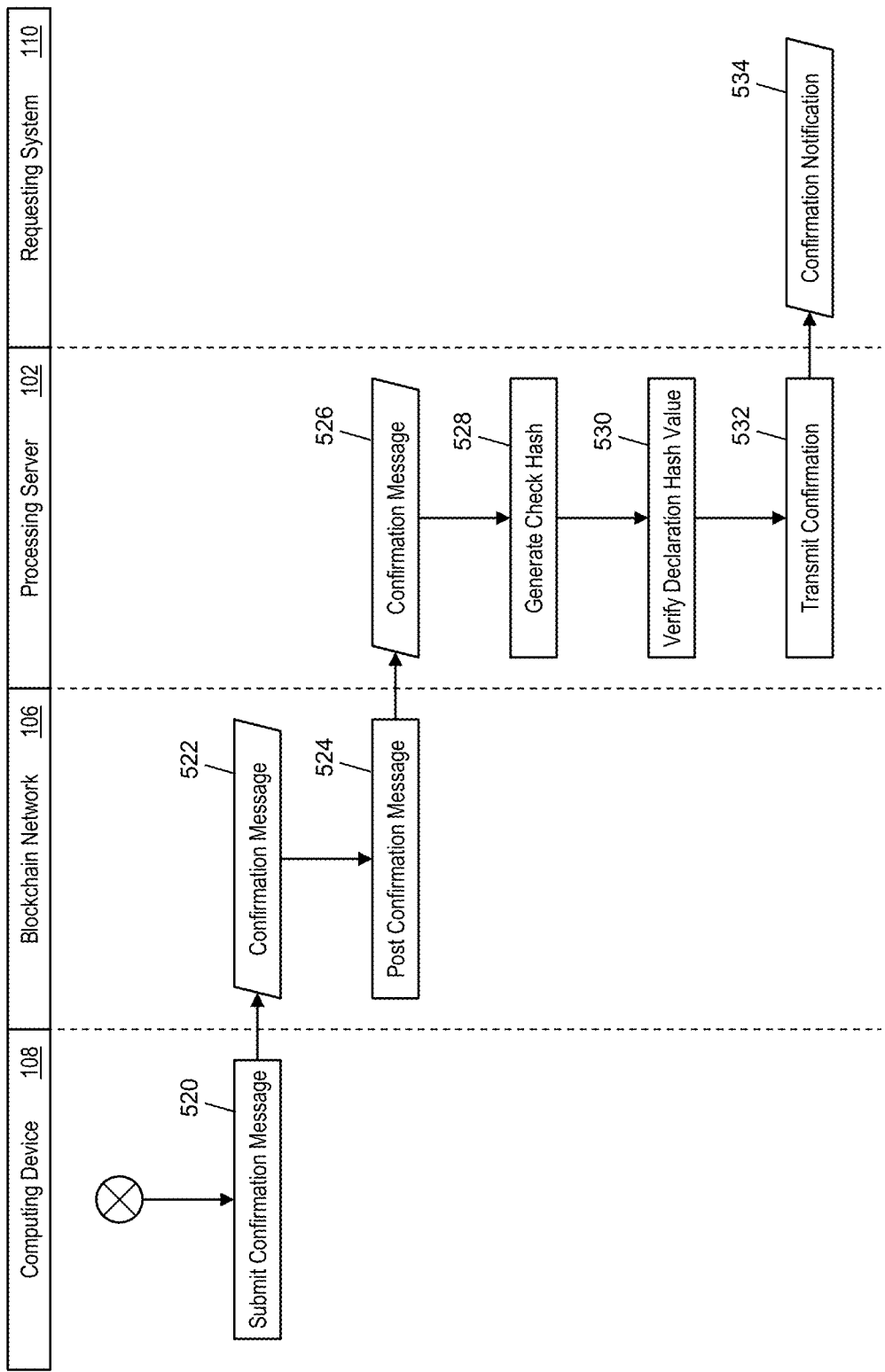

FIGS. 5A and 5B illustrate an example process in the system 100 of FIG. 1 for verifying proof of assertion of a specific value presented by the user 104 using the blockchain network 106 and a hashing-oriented transaction scheme.

In step 502, the user 104 may, using the computing device 108, submit a declaration message to the blockchain network 106. The declaration message may include at least an identifier, referred to herein as a data entry identifier, a specific value and an identity hash value. In step 504, the blockchain network 106 may receive the declaration message. In step 506, the declaration message may be included in a new block that is verified and added to the blockchain. In some embodiments, the data entry identifier for the declaration message may be identified by the blockchain network 106 in step 504 or 506, which may be returned to the computing device 108.

In step 508, the computing device 108 and requesting system 110 may enter an arrangement. For instance, in the above example, the requesting system 110 may request that the user 104 provides proof of their identity, which the user 104 may attempt to accomplish using an identity document as the specific value included in the declaration message that was submitted to the blockchain network 106. In step 510, as part of the arrangement, the user 104 may, via the computing device 108, provide the data entry identifier for the declaration message to the requesting system 110. In step 512, the requesting system 110 may submit a confirmation request to the processing server 102 using a suitable communication network and method. The confirmation request may include at least the data entry identifier.

In step 514, the receiving device 202 of the processing server 102 may receive the confirmation request from the requesting system 110. In step 516, the processing server 102 may electronically transmit a request message to the computing device 108, requesting that the user 104 submit a confirmation message to the blockchain network 106 to assert proof of the specific value (e.g., the identity document in the above example). In step 518, the computing device 108 may receive the request message from the processing server 102.

In step 520, the computing device 108 may submit a confirmation message to the blockchain network 106. The confirmation message may include at least the data entry identifier and one or more chain values. In step 522, the blockchain network 106 may receive the confirmation message. In step 524, the confirmation message may be included in a new block that is generated, validated, and posted to the blockchain. In step 526, the receiving device 202 of the processing server 102 may receive the confirmation message via an update of the blockchain network. In step 528, the generation module 220 of the processing server 102 may generate a check hash value by hashing the chain values found in the confirmation message as well as the specific value found in the declaration message.

In step 530, the verification module 222 of the processing server 102 may attempt verify the check hash value by comparing it to the identity hash value found in the declaration message, as verification of the proof of the assertion by the user 104. In step 532, the transmitting device 224 of the processing server 102 may electronically transmit a confirmation notification to the requesting system 110. The confirmation notification may include a result of the verification, which, if successful, may confirm the user's assertion (e.g., that they are the person identified in the identity document in the above example). In step 534, the requesting system 110 may receive the confirmation notification from the processing server 102.

Exemplary Method for Verifying Proof of Assertion of a Value

Figure 6:
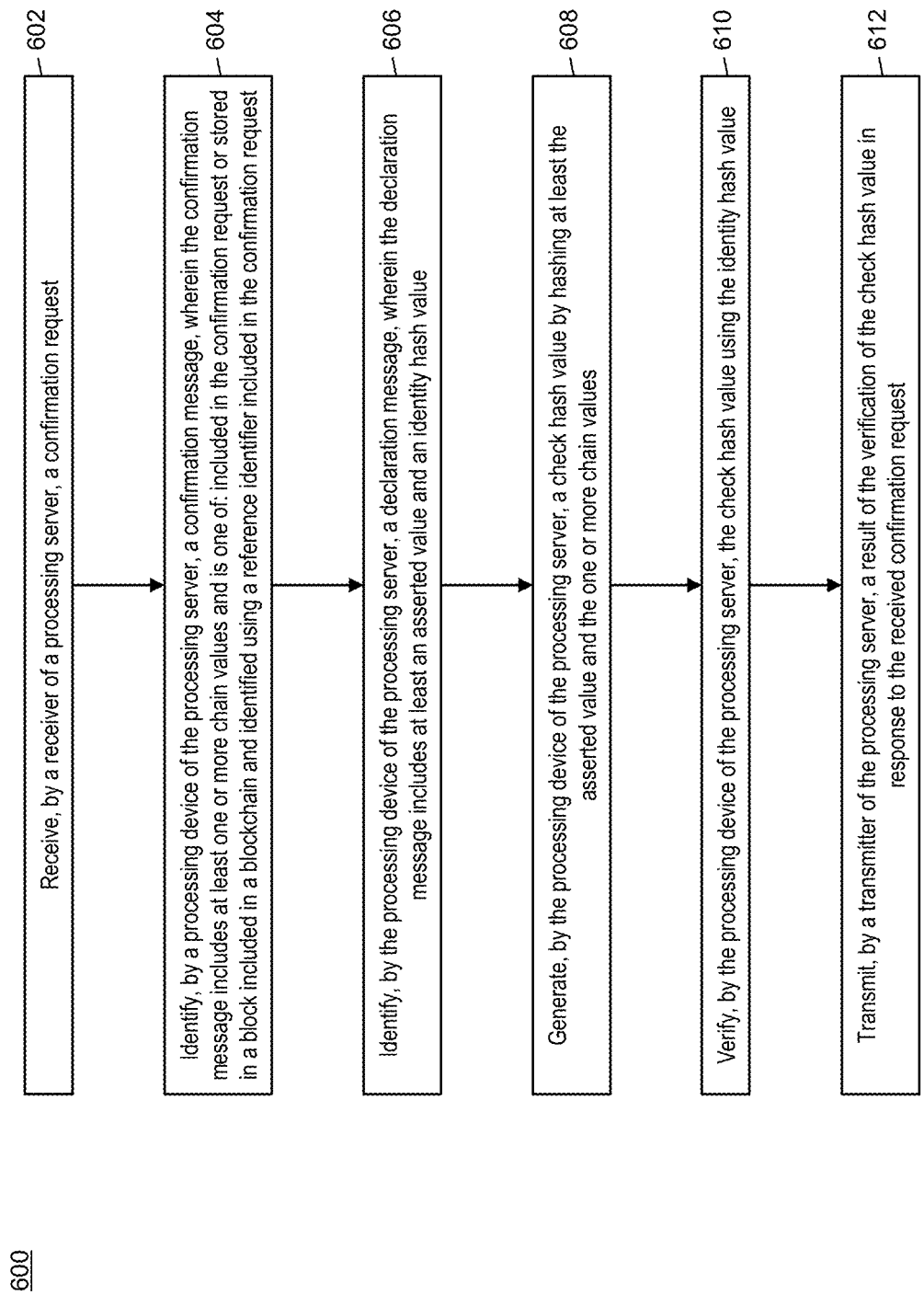
FIG. 6 is a flow chart illustrating an exemplary method for verifying proof of assertion of a value using a hash-oriented transaction scheme in accordance with exemplary embodiments.

FIG. 6 illustrates a method 600 for verifying proof of an assertion of a value via the use of a blockchain combined with a hash-oriented transaction scheme.

In step 602, a confirmation request may be received by a receiver (e.g., the receiving device 202) of a processing server (e.g., the processing server 102). In step 604, a confirmation message may be identified by a processing device (e.g., the querying module 218) of the processing server, wherein the confirmation message includes at least one or more chain values and is one of: included in the confirmation request or stored in a block included in a blockchain and identified using a reference identifier included in the confirmation request. In step 606, a declaration message may be identified by the processing device of the processing server, wherein the declaration message includes at least an asserted value and an identity hash value.

In step 608, a check hash value may be generated by the processing device (e.g., generation module 220) of the processing server by hashing at least the asserted value and the one or more chain values. In step 610, the check hash value may be verified by the processing device (e.g., verification module 222) of the processing server using the identity hash value. In step 612, a result of the verification of the check hash value may be transmitted by a transmitter (e.g., the transmitting device 224) of the processing server in response to the received confirmation request.

Exemplary Method for Moderation in a Permissioned Blockchain

Figure 7:
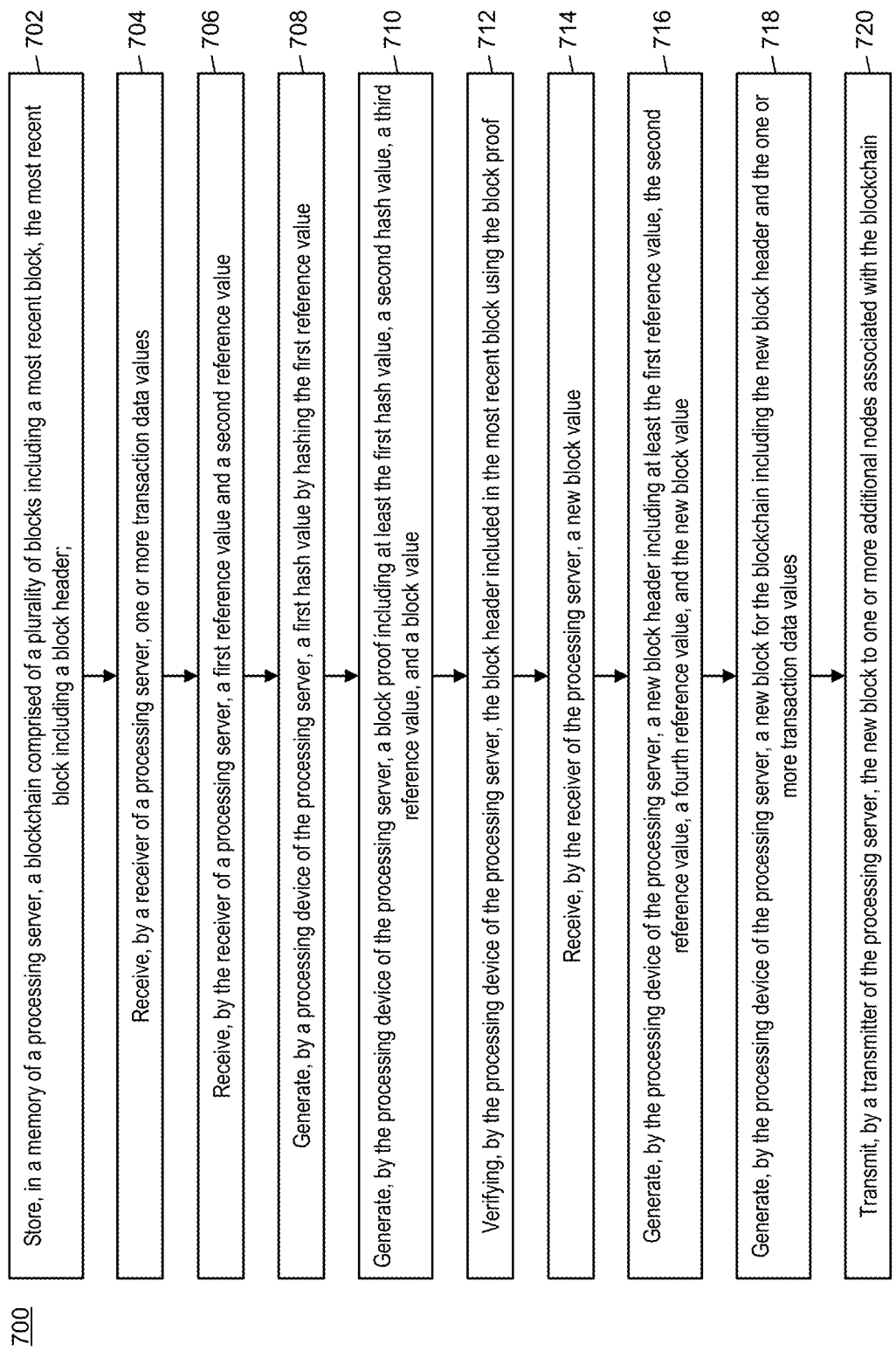
FIG. 7 is a flow chart illustrating an exemplary method for moderation in a permissioned blockchain using a hash-oriented scheme in accordance with exemplary embodiments.

FIG. 7 illustrates a method 700 for moderation in a permissioned blockchain using a hash-oriented transaction scheme.

In step 702, a blockchain may be stored in a memory (e.g., memory 226) of a processing server (e.g., the processing server 102), where the blockchain is comprised of a plurality of blocks including a most recent block, the most recent block including a block header. In step 704, one or more transaction data values may be received by a receiver (e.g., the receiving device 202) of the processing server. In step 706, a first reference value and a second reference value may be received by the receiver of the processing server. In step 708, a first hash value may be generated by a processing device (e.g., the generation module 220) of the processing server by hashing the first reference value. In step 710, a block proof including at least the first hash value, a second hash value, a third reference value, and a block value may be generated by the processing device of the processing server.

In step 712, the block header included in the most recent block may be verified by the processing device (e.g., the verification module 222) using the block proof. In step 714, a new block value may be received by the receiver of the processing server. In step 716, a new block header may be generated by the processing device of the processing server, the new block header including at least the first reference value, the second reference value, a fourth reference value, and the new block value. In step 718, a new block may be generated for the blockchain by the processing device of the processing server, the new block including the new block header and the one or more transaction data values. In step 720, the new block may be transmitted by a transmitter (e.g., transmitting device 224) of the processing server to one or more additional nodes associated with the blockchain.

In one embodiment, the method 700 may further include generating, by the processing device of the processing server, a Merkle tree using the one or more transaction data values, wherein the new block header further includes a root of the Merkle tree. In a further embodiment, the new block header may further include version data and a block header reference value. In an even further embodiment, the method 700 may also include generating, by the processing device of the processing server, the block header reference value by hashing the verified block header. In some embodiments, the method 700 may further include generating, by the processing device of the processing server, the block value by hashing a combination of the first reference value, the second reference value, the fourth reference value, and one or more data points. In a further embodiment, the one or more data points may include at least version data, a block header reference value, and a root of a Merkle tree.

In one embodiment, the method 700 may also include generating, by the processing device of the processing server, the second hash value by hashing the fourth reference value. In a further embodiment, the fourth reference value may be stored in the memory of the processing server. In some embodiments, the first reference value and second reference value may be received from an external computing system (e.g., the moderating entity 112), and the new block value may be received from the external computing system. In a further embodiment, the external computing system may be one of the one or more additional nodes associated with the blockchain.

Computer System Architecture

Figure 8:
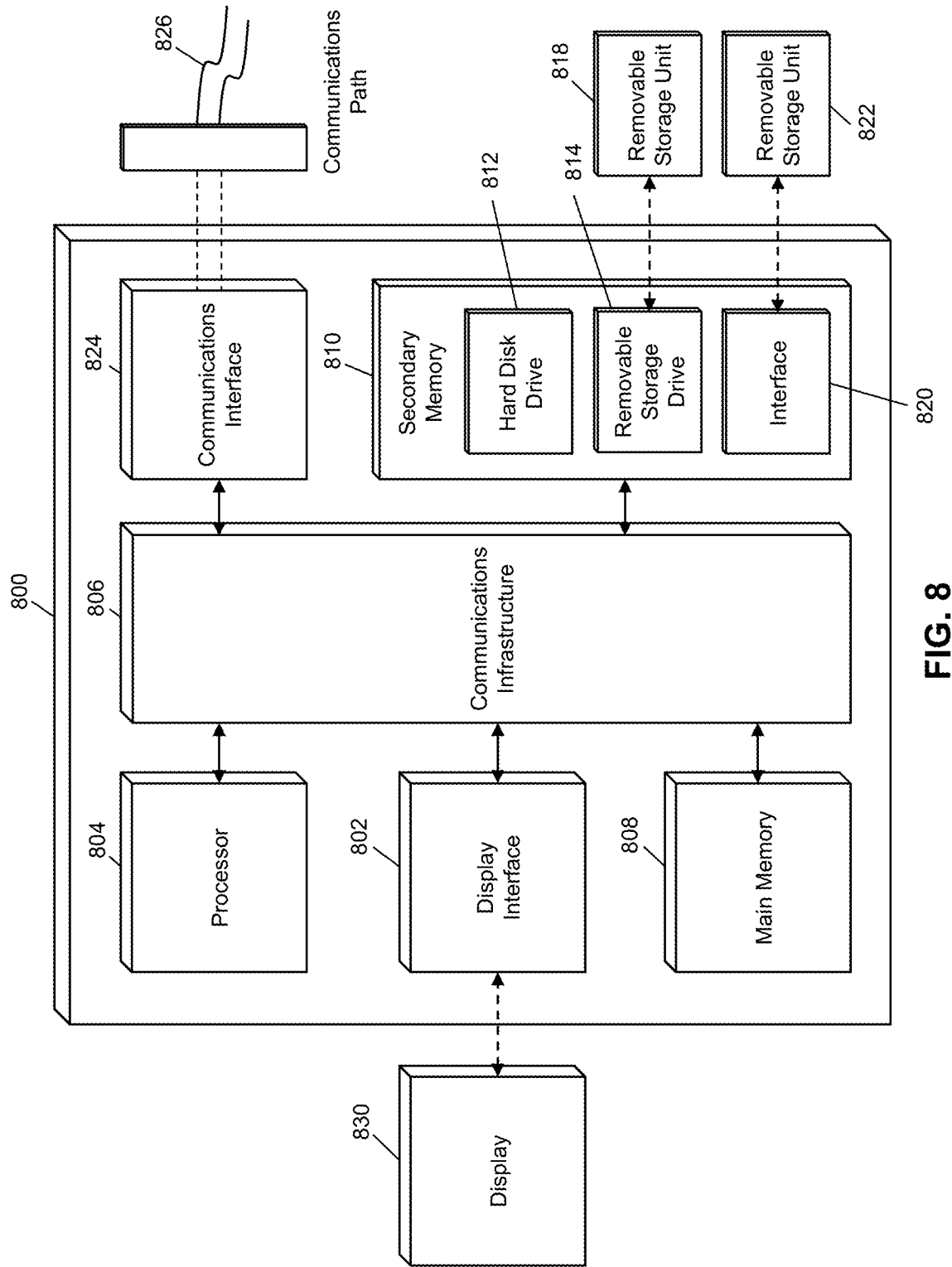
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 4, 5A, 5B, 6 and 7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3, 4, 5A, 5B, 6 and 7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for moderation in a permissioned blockchain using a hash-oriented scheme. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for moderation in a permissioned blockchain using a hash-oriented scheme, comprising:
    generating, by a processing device of a processing server, a first hash value by hashing a first reference value;
    generating, by the processing device of the processing server, a block proof including at least the first hash value, a second hash value, a third reference value, and a block value;
    verifying, by the processing device of the processing server, a block header included in a most recent block of a blockchain using the block proof;
    receiving, by a receiver of the processing server, a new block value;
    generating, by the processing device of the processing server, a new block header including at least the first reference value, a second reference value, a fourth reference value, and the new block value;
    generating, by the processing device of the processing server, a new block for the blockchain including the new block header and one or more transaction data values; and
    transmitting, by a transmitter of the processing server, the new block to one or more additional nodes associated with the blockchain.

2. The method of claim 1, further comprising:
    generating, by the processing device of the processing server, a Merkle tree using the one or more transaction data values, wherein the new block header further includes a root of the Merkle tree.

3. The method of claim 2, wherein the new block header further includes version data and a block header reference value.

4. The method of claim 3, further comprising:
    generating, by the processing device of the processing server, the block header reference value by hashing the verified block header.

5. The method of claim 1, further comprising:
    generating, by the processing device of the processing server, the block value by hashing a combination of the first reference value, the second reference value, the fourth reference value, and one or more data points.

6. The method of claim 5, wherein the one or more data points includes at least version data, a block header reference value, and a root of a Merkle tree.

7. The method of claim 1, further comprising:
    generating, by the processing device of the processing server, the second hash value by hashing the fourth reference value.

8. The method of claim 7, further comprising:
    storing the fourth reference value is in a memory of the processing server.

9. The method of claim 1, wherein the first reference value and second reference value are received from an external computing system, and the new block value is received from the external computing system.

10. The method of claim 9, wherein the external computing system is one of the one or more additional nodes associated with the blockchain.

11. A system for moderation in a permissioned blockchain using a hash-oriented scheme, comprising:
    a processing server as a node associated with a blockchain; and
    one or more additional nodes associated with the blockchain,
    wherein
    the processing server includes at least a
        transmitter,
        a receiver, and
        a processing device generating a first hash value by hashing a first reference value, generating a block proof including at least the first hash value, a second hash value, a third reference value, and a block value, and verifying a block header included in a most recent block of the blockchain using the block proof,
        the receiver receives a new block value,
        the processing device further generates a new block header including at least the first reference value, a second reference value, a fourth reference value, and the new block value, and generates a new block for the blockchain including the new block header and one or more transaction data values, and
        the transmitter transmits the new block to at least one of the one or more additional nodes associated with the blockchain.

12. The system of claim 11, wherein the processing device of the processing server further generates a Merkle tree using the one or more transaction data values, and the new block header further includes a root of the Merkle tree.

13. The system of claim 12, wherein the new block header further includes version data and a block header reference value.

14. The system of claim 13, wherein the processing device of the processing server further generates the block header reference value by hashing the verified block header.

15. The system of claim 11, wherein the processing device of the processing server further generates the block value by hashing a combination of the first reference value, the second reference value, the fourth reference value, and one or more data points.

16. The system of claim 15, wherein the one or more data points includes at least version data, a block header reference value, and a root of a Merkle tree.

17. The system of claim 11, wherein the processing device of the processing server further generates the second hash value by hashing the fourth reference value.

18. The system of claim 17, wherein the processing server further includes a memory, and wherein the fourth reference value is stored in the memory of the processing server.

19. The system of claim 11, wherein the first reference value and second reference value are received from an external computing system, and the new block value is received from the external computing system.

20. The system of claim 19, wherein the external computing system is one of the one or more additional nodes associated with the blockchain.

* * * * *